(12) United States Patent
Chen et al.

(10) Patent No.: US 8,730,302 B2
(45) Date of Patent: May 20, 2014

(54) METHOD AND SYSTEM FOR ENHANCING 3D EFFECTS FOR 3D VIDEO RENDERING

(75) Inventors: Xuemin Chen, Rancho Santa Fe, CA (US); Nambi Seshadri, Irvine, CA (US); Jeyhan Karaoguz, Irvine, CA (US); Chris Boross, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 443 days.

(21) Appl. No.: 13/077,926

(22) Filed: Mar. 31, 2011

(65) Prior Publication Data

US 2012/0050464 A1 Mar. 1, 2012

Related U.S. Application Data

(60) Provisional application No. 61/377,867, filed on Aug. 27, 2010, provisional application No. 61/439,290, filed on Feb. 3, 2011, provisional application No. 61/439,193, filed on Feb. 3, 2011, provisional application No. 61/439,274, filed on Feb. 3, 2011, provisional application No. 61/439,283, filed on Feb. 3, 2011, provisional application No. 61/439,130, filed on Feb. 3, 2011, provisional application No. 61/439,119, filed on Feb. 3, 2011, provisional application No. 61/439,297, filed on Feb. 3, 2011, provisional application No. 61/439,201, filed on Feb. 3, 2011, provisional application No. 61/439,209, filed on Feb. 3, 2011, provisional application No. 61/439,113, filed on Feb. 3, 2011, provisional application No. 61/439,103, filed on Feb. 3, 2011, provisional application No. 61/439,083, filed on Feb. 3, 2011, provisional application No. 61/439,301, filed on Feb. 3, 2011.

(51) Int. Cl.
*H04N 13/00* (2006.01)

(52) U.S. Cl.
USPC .............................................. 348/43

(58) Field of Classification Search
None
See application file for complete search history.

(56) References Cited

U.S. PATENT DOCUMENTS 6,754,367 B1* 6/2004 Ito et al. ................... 382/103
2003/0156117 A1* 8/2003 Higuchi et al. ............ 345/582

(Continued)

OTHER PUBLICATIONS

Policarpo et al., Real-Time Relief Mapping on Arbitrary Polygonal Surfaces, (2005), Proceedings of the 2005 Symposium on Interactive 3D Graphics.*

(Continued)

*Primary Examiner* — Joseph Ustaris
*Assistant Examiner* — Jill Sechser
(74) *Attorney, Agent, or Firm* — Brinks Gilson & Lione

(57) ABSTRACT

A three-dimensional (3D) video rendering device monitors 3D effects associated with an object in a received 3D video image-by-image. The object may be re-located to a preferred location to adjust the associated 3D effects. Two-dimensional (2D) image data and corresponding depth information for the object at the current location are interpolated to the preferred location. A location difference and lighting condition changes corresponding to the re-location of the object are calculated to determine a view angle and lighting conditions for the object at the preferred location. 2D image data and depth information for the object at the preferred location are estimated based on the determined view angle and the determined lighting conditions for the object at the preferred location. The estimated 2D image data and the estimated corresponding depth information may be applied to the object at the preferred location to enhance the associated 3D effects for 3D video rendering.

20 Claims, 4 Drawing Sheets

(56) References Cited

U.S. PATENT DOCUMENTS

| | | | |
|---|---|---|---|
| 2006/0221250 A1* | 10/2006 | Rossbach et al. | 348/630 |
| 2007/0060336 A1* | 3/2007 | Marks et al. | 463/30 |
| 2008/0037829 A1* | 2/2008 | Givon | 382/107 |
| 2009/0051796 A1* | 2/2009 | Massie et al. | 348/302 |
| 2010/0215220 A1* | 8/2010 | Yamaguchi et al. | 382/106 |

OTHER PUBLICATIONS

Comparison of Stereo Video Coding Support in MPEG-4 MAC, H.264/AVC and H.264/SVC, C.T.E.R, Herwage, et al., 6 pages.

Real time Hand Gesture Recognition using a Range Camera, Zhi Li, et al., ACRA, Dec. 2-4, 2009, 7 pages.

* cited by examiner

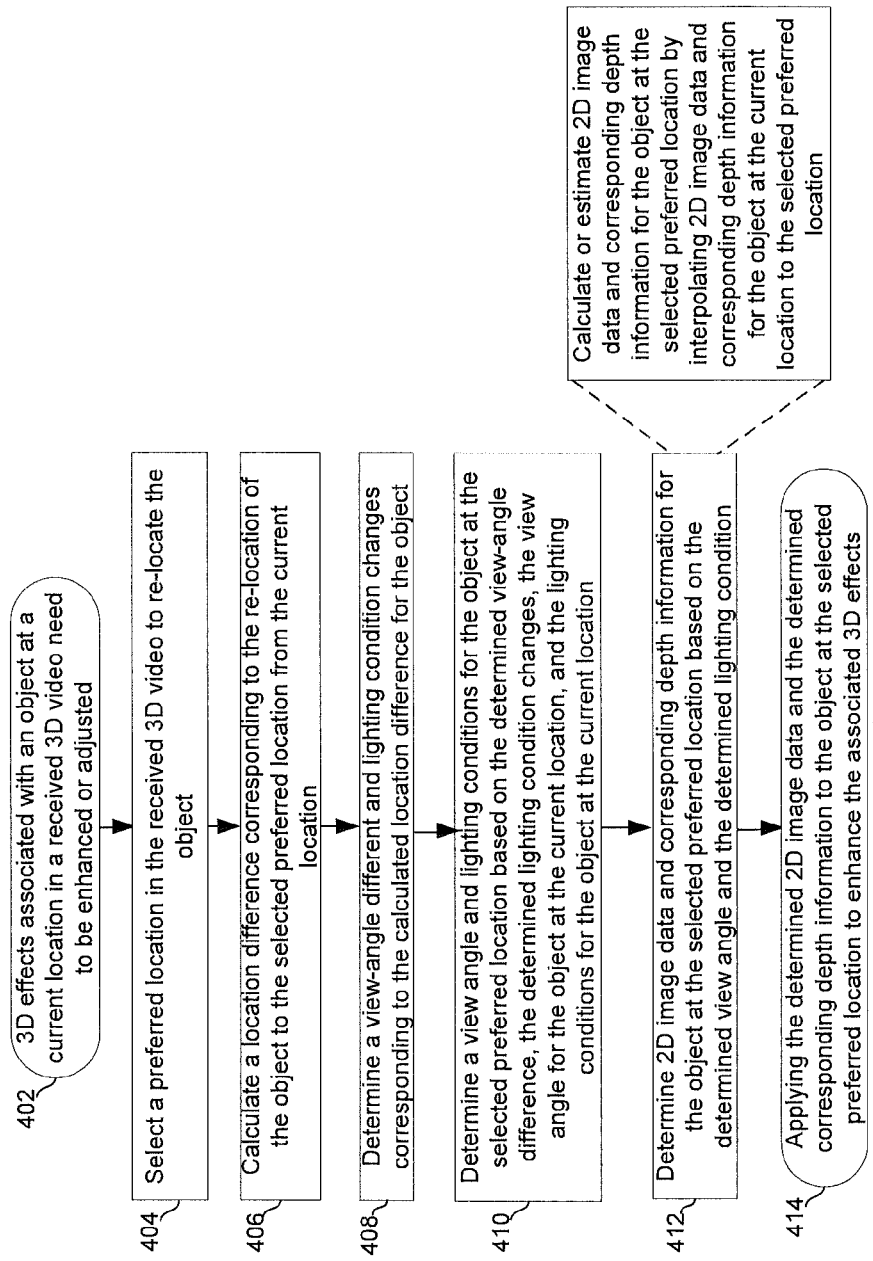

METHOD AND SYSTEM FOR ENHANCING 3D EFFECTS FOR 3D VIDEO RENDERING

CROSS-REFERENCE TO RELATED APPLICATIONS/INCORPORATION BY REFERENCE

This patent application makes reference to, claims priority to, and claims benefit from U.S. Provisional Application Ser. No. 61/377,867, which was filed on Aug. 27, 2010.

This patent application makes reference to, claims priority to, and claims benefit from U.S. Provisional Application Ser. No. 61/439,290, which was filed on Feb. 3, 2011.

This application also makes reference to:
U.S. Patent Application Ser. No. 61/439,193 filed on Feb. 3, 2011;
U.S. patent application Ser. No. 13/077,900 filed on Mar. 31, 2011;
U.S. Patent Application Ser. No. 61/439,274 filed on Feb. 3, 2011;
U.S. patent application Ser. No. 13/077,912 filed on Mar. 31, 2011;
U.S. Patent Application Ser. No. 61/439,283 filed on Feb. 3, 2011;
U.S. patent application Ser. No. 13/077,922 filed on Mar. 31, 2011;
U.S. Patent Application Ser. No. 61/439,130 filed on Feb. 3, 2011;
U.S. patent application Ser. No. 13/077,886 filed on Mar. 31, 2011;
U.S. Patent Application Ser. No. 61/439,119 filed on Feb. 3, 2011;
U.S. patent application Ser. No. 13/077,893 filed on Mar. 31, 2011;
U.S. Patent Application Ser. No. 61/439,297 filed on Feb. 3, 2011;
U.S. patent application Ser. No. 13/077,923 filed on Mar. 31, 2011;
U.S. Patent Application Ser. No. 61/439,201 filed on Feb. 3, 2011;
U.S. Patent Application Ser. No. 61/439,209 filed on Feb. 3, 2011;
U.S. Patent Application Ser. No. 61/439,113 filed on Feb. 3, 2011;
U.S. patent application Ser. No. 13/077,868 filed on Mar. 31, 2011;
U.S. Patent Application Ser. No. 61/439,103 filed on Feb. 3, 2011;
U.S. patent application Ser. No. 13/077,880 filed on Mar. 31, 2011;
U.S. Patent Application Ser. No. 61/439,083 filed on Feb. 3, 2011;
U.S. patent application Ser. No. 13/077,899 filed on Mar. 31, 2011;
U.S. Patent Application Ser. No. 61/439,301 filed on Feb. 3, 2011; and
U.S. patent application Ser. No. 13/077,930 filed on Mar. 31, 2011.

Each of the above stated applications is hereby incorporated herein by reference in its entirety.

FIELD OF THE INVENTION

Certain embodiments of the invention relate to video processing. More specifically, certain embodiments of the invention relate to a method and system for enhancing 3D effects for 3D video rendering.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV, a 3D video is often desirable because it is often more realistic to viewers than the 2D counterpart. A 3D video comprises a left view video and a right view video. A 3D video frame may be produced by combining left view video components and right view video components, respectively.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for enhancing 3D effects for 3D video rendering, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4 is a flow chart illustrating exemplary steps that may be performed to estimate 2D video data and corresponding depth information to enhance 3D effects, in accordance with an embodiment of the invention.

DETAILED DESCRIPTION OF THE INVENTION

Certain embodiments of the invention may be found in a method and system for enhancing 3D effects for 3D video rendering. In various embodiments of the invention, a three-dimensional (3D) video rendering device is operable to receive a 3D video for 3D video rendering. The 3D video rendering device may monitor or track 3D effects associated with an object of interest in the received 3D video image-by-image. In instances where the associated 3D effects for the object at a current location are not satisfactory to the user, the object may be re-located to a preferred location. Two-dimensional (2D) image data and corresponding depth information for the object at the current location may be interpolated to the preferred location. The associated 3D effects for the object may be enhanced or adjusted utilizing the interpolated 2D image data and the interpolated corresponding depth information. The 3D video rendering device may evaluate the associated 3D effects for the object at the current location and may select the preferred location for re-locating the object accordingly. A location difference corresponding to the re-location of the object may be calculated to determine a corresponding view-angle difference and lighting condition changes. Lighting conditions for the scene of the image data may comprise information such as lighting and reflecting direction, and/or contrasting density. A view angle and lighting conditions for the object at the selected preferred location may be determined based on the determined view-angle difference, the determined lighting condition changes, a view angle and lighting conditions for the object at the current location. 2D image data and corresponding depth information for the object at the selected preferred location may be estimated based on the determined view angle and the determined lighting conditions for the object at the selected preferred location. The estimated 2D image data and the estimated corresponding depth information may be utilized to enhance or adjust the 3D associated effects for the object at the selected preferred location for 3D video rendering.

Figure 1:
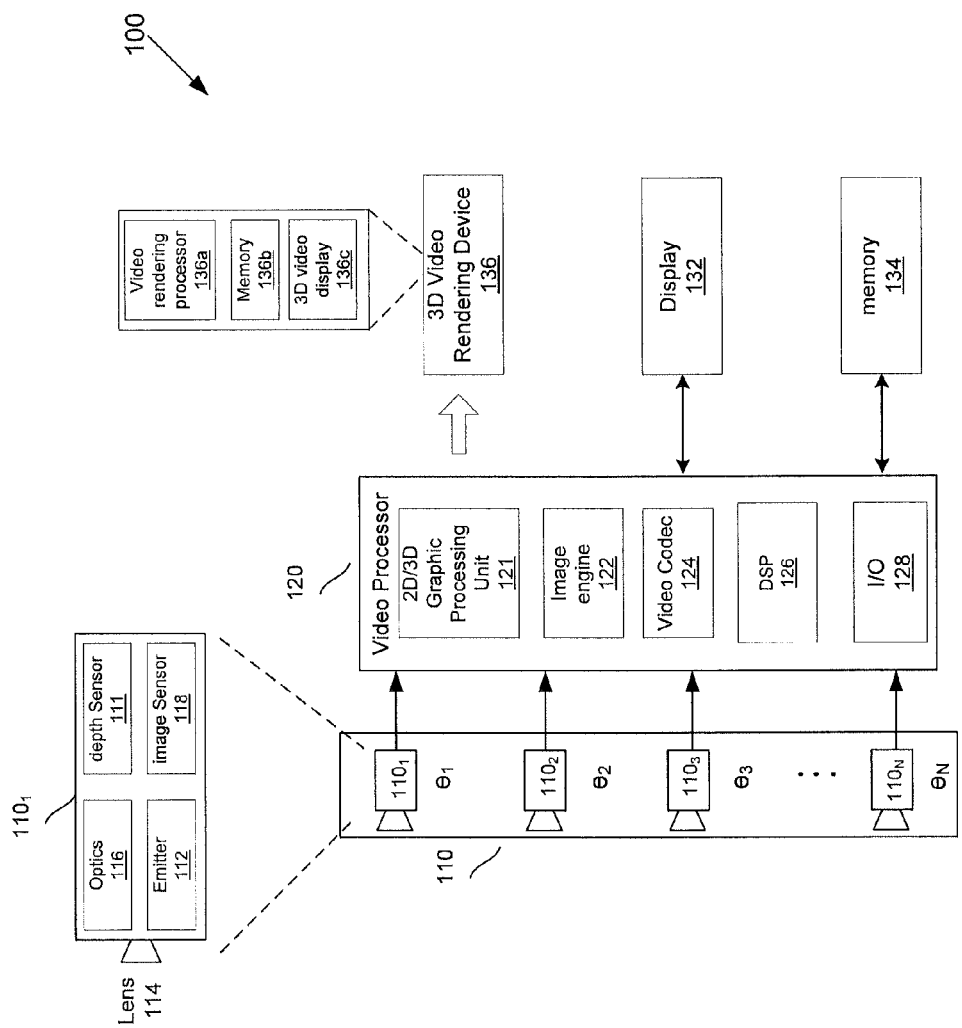
FIG. 1 is a diagram illustrating an exemplary video communication system that is operable to enhance 3D effects for 3D video rendering, in accordance with an embodiment of the invention.

FIG. 1 is a diagram illustrating an exemplary video communication system that is operable to enhance 3D effects for 3D video rendering, in accordance with an embodiment of the invention. Referring to FIG. 1, there is shown a video communication system 100. The video communication system 100 comprises a monoscopic video camera array 110, a video processor 120, a display 132, a memory 134 and a 3D video rendering device 136.

The monoscopic video camera array 110 may comprise a plurality of single-viewpoint or monoscopic video cameras $110_1$-$110_N$, where the parameter N is the number of monoscopic video cameras. Each of the monoscopic video cameras $110_1$-$110_N$ may be placed at a certain view angle with respect to an encountered scene in front of the monoscopic video camera array 110. Each of the monoscopic video cameras $110_1$-$110_N$ may operate independently to collect or capture information for the encountered scene. The monoscopic video cameras $110_1$-$110_N$ each may be operable to capture 2D image data and corresponding depth information for the encountered scene. A 2D video comprises a collection of 2D sequential images. 2D image data for the 2D video specifies intensity and/or color information in terms of pixel position in the 2D sequential images. Depth information for the 2D video represents distance to objects visible in terms of pixel position in the 2D sequential images. The monoscopic video camera array 110 may provide or communicate the captured image data and the captured corresponding depth information to the video processor 120 for further process to support 2D and/3D video rendering and/or playback.

A monoscopic video camera such as the monoscopic video camera $110_1$ may comprise a depth sensor 111, an emitter 112, a lens 114, optics 116, and one or more image sensors 118. The monoscopic video camera $110_1$ may comprise suitable logic, circuitry, interfaces, and/or code that may be operable to capture a 2D monoscopic video via a single viewpoint corresponding to the lens 114. The monoscopic video camera $110_1$ may be operable to collect corresponding depth information for the captured 2D video via the depth sensor 111.

The depth sensor 111 may comprise suitable logic, circuitry, interfaces, and/or code that may be operable to detect electromagnetic (EM) waves in the infrared spectrum. The depth sensor 111 may determine or detect depth information for objects in front of the lens 114 based on corresponding infrared EM waves. For example, the depth sensor 111 may sense or capture depth information for the objects based on time-of-flight of infrared EM waves transmitted by the emitter 112 and reflected from the objects back to the depth sensor 111.

The emitter 112 may comprise suitable logic, circuitry, interfaces, and/or code that may be operable to produce and/or transmit electromagnetic waves in infrared spectrum, for example.

The lens 114 is an optical component that may be utilized to capture or sense EM waves. The captured EM waves may be focused through the optics 116 on the image sensor(s) 118 to form 2D images for the scene in front of the lens 114.

The optics 116 may comprise optical devices for conditioning and directing EM waves received via the lens 114. The optics 116 may direct the received EM waves in the visible spectrum to the image sensor(s) 118 and direct the received EM waves in the infrared spectrum to the depth sensor 111, respectively. The optics 116 may comprise one or more lenses, prisms, luminance and/or color filters, and/or mirrors.

The image sensor(s) 118 may each comprise suitable logic, circuitry, interfaces, and/or code that may be operable to sense optical signals focused by the lens 114. The image sensor(s) 118 may convert the optical signals to electrical signals so as to capture intensity and/or color information for the scene in front of the lens 114. Each image sensor 118 may comprise, for example, a charge coupled device (CCD) image sensor or a complimentary metal oxide semiconductor (CMOS) image sensor.

The video processor 120 may comprise suitable logic, circuitry, interfaces, and/or code that may be operable to handle and control operations of various device components such as the monoscopic video camera array 110, and manage output to the display 132 and/or the 3D video rendering device 136. The video processor 120 may comprise a 2D/3D graphic processing unit 121, an image engine 122, a video codec 124, a digital signal processor (DSP) 126 and an input/output (I/O) 128. The video processor 120 may utilize the image sensors 118 to capture 2D monoscopic image data. The video processor 120 may utilize the lens 114 and the optics 116 to collect corresponding depth information for the captured 2D monoscopic image data. The video processor 120 may process the captured 2D monoscopic image data and the captured corresponding depth information via the image engine 122 and the video codec 124, for example. In this regard, the video processor 120 may be operable to compose a 2D and/or 3D video from the processed 2D image data and the processed corresponding depth information for 2D and/or 3D video rendering and/or playback. The composed 2D and/or 3D video may be presented or displayed to a user via the display 132 and/or the 3D video rendering device 136. The video processor 120 may also enable or allow a user to interact with the monoscopic video camera array 110, when needed, to support or control video recording and/or playback.

The 2D/3D graphic processing unit 121 may comprise suitable logic, circuitry, interfaces, and/or code that may be operable to accelerate graphics rendering. The 2D/3D graphic processing unit 121 may be operable to track or monitor view angles and lighting conditions for objects of interest. The 2D/3D graphic processing unit 121 may be operable to determine and/or calculate view angles and lighting conditions associated with the objects of interest. The 2D/3D graphic processing unit 121 may correct or adjust view angle and lighting conditions associated with the objects of interest to enhance the corresponding 3D effects. The 2D/3D graphic processing unit 121 may be integrated internally or externally to the video processor 120.

The image engine 122 may comprise suitable logic, circuitry, interfaces, and/or code that may be operable to provide or output view-angle dependent 2D image and corresponding view-angle dependent depth information, respectively. A view-angle dependent 2D image is referred to as a 2D image in which values of 2D image data varies in terms of view angles. Similarly, view-angle dependent depth information is referred to as depth information that varies in terms of view angles. In this regard, the image engine 122 may model or map 2D monoscopic image data and corresponding depth information, captured by the monoscopic video camera array 110, to an image mapping function in terms of view angles and lighting conditions. The image mapping function may convert the captured 2D monoscopic image data and the captured corresponding depth information to different set of 2D image data and corresponding depth information depending on view angles and lighting conditions. The image mapping function may be determined, for example, by matching or fitting the captured 2D monoscopic image data and the captured corresponding depth information to known view angles and lighting conditions of the monoscopic video cameras $110_1$-$110_N$. The image engine 122 may utilize the determined image mapping function to map or convert the captured monoscopic image data and the captured corresponding depth information to view-angle dependent 2D image data and view-angle dependent depth information, respectively.

The video codec 124 may comprise suitable logic, circuitry, interfaces, and/or code that may be operable to perform video compression and/or decompression. The video codec 124 may utilize various video compression and/or decompression algorithms such as video compression and/or decompression algorithms specified in MPEG-2, and/or other video formats for video coding.

The DSP 126 may comprise suitable logic, circuitry, interfaces, and/or code that may be operable to perform signal processing of image data and depth information supplied from the monoscopic video camera array 110.

The I/O module 128 may comprise suitable logic, circuitry, interfaces, and/or code that may enable the monoscopic video camera array 110 to interface with other devices in accordance with one or more standards such as USB, PCI-X, IEEE 1394, HDMI, DisplayPort, and/or analog audio and/or analog video standards. For example, the I/O module 128 may be operable to communicate with the image engine 122 and the video codec 124 for a 2D and/or 3D video for a given user's view angle, output the resulting 2D and/or 3D images, read from and write to cassettes, flash cards, or other external memory attached to the video processor 120, and/or output video externally via one or more ports such as a IEEE 1394 port, a HDMI and/or an USB port for transmission and/or rendering.

The display 132 may comprise suitable logic, circuitry, interfaces, and/or code that may be operable to display images to a user. The display 132 may comprise a liquid crystal display (LCD), a light emitting diode (LED) display and/or other display technologies on which images captured via the monoscopic video camera array 110 may be displayed to the user at a given user's view angle.

The memory 134 may comprise suitable logic, circuitry, interfaces and/or code that may be operable to store information such as executable instructions and data that may be utilized by the monoscopic video camera array 110. The executable instructions may comprise various video compression and/or decompression algorithms utilized by the video codec 124 for video coding. The data may comprise captured images and/or coded video. The memory 134 may comprise RAM, ROM, low latency nonvolatile memory such as flash memory and/or other suitable electronic data storage.

The 3D video rendering device 136 may comprise suitable logic, circuitry, interfaces, and/or code that may be operable to render images supplied from the monoscopic video camera array 110. The 3D video rendering device 136 may be coupled to the video processor 120 internally or externally. The 3D video rendering device 136 may be adapted to different user's view angles and lighting conditions to render 3D video output from the video processor 120.

The 3D video rendering device 136 may comprise a video rendering processor 136a, a memory 136b and a 3D video display 136c. The video rendering processor 136a may comprise suitable logic, circuitry, interfaces, and/or code that may be operable to receive, from the video processor 120, a 3D video created for a given view angle. The video rendering processor 136a may be adapted to the given view angle for rendering the received 3D video.

The memory 136b may comprise suitable logic, circuitry, interfaces, and/or code that may be operable to store information such as executable instructions and data that may be utilized by the video rendering processor 136a for 3D video rendering. The executable instructions may comprise various image processing algorithms utilized by the video rendering processor 136a for enhancing 3D effects. The data may comprise 3D videos received from the video processor 120. The memory 136b may comprise RAM, ROM, low latency nonvolatile memory such as flash memory and/or other suitable electronic data storage.

The 3D video display 136c may comprise suitable logic, circuitry, interfaces, and/or code that may be operable to display 3D images to a user. The 3D video display 136c may comprise a liquid crystal display (LCD), a light emitting diode (LED) display and/or other display technologies on which 3D images from the video processor 120 may be displayed to the user at a given view angle.

Although the monoscopic video camera array 110 is illustrated in FIG. 1 to enhance 3D effects for 3D video rendering, the invention is not so limited. In this regard, an array of monoscopic video sensing devices, which comprises one or more image sensors and one or more depth sensors, may be utilized to enhance 3D effects for 3D video rendering without departing from the spirit and scope of the various embodiments of the invention. An image sensor may comprise one or more light emitters and/or one or more light receivers.

In an exemplary operation, the monoscopic video camera array 110 may be operable to concurrently or simultaneously capture a plurality of 2D monoscopic images and corresponding depth information. For example, the monoscopic video camera array 110 may capture 2D monoscopic images via the image sensors 118. Corresponding depth information for the captured 2D monoscopic images may be collected or captured via the sensor 111. The monoscopic video camera array 110 may provide or communicate the captured 2D monoscopic images and corresponding depth information to the video processor 120. The video processor 120 may be operable to perform video processing on the captured 2D monoscopic images and the captured corresponding depth information via device components such as the image engine 122.

U.S. Application Ser. No. 61/439,283, which is filed on even date herewith provides detailed descriptions that a video processor such as the video processor 120 may be operable to determine an image mapping function that maps or converts 2D monoscopic images data and corresponding depth information captured via the monoscopic video camera array 110 to 2D images data and corresponding depth information in terms of view angles and/or lighting conditions, and is hereby incorporated herein by reference in its entirety.

In this regard, the image engine 122 may utilize the determined image mapping function to map or match the captured 2D monoscopic images data and the captured corresponding depth information to view angles and/or lighting conditions. The image mapping function may be determined, for example, by matching or fitting the captured 2D monoscopic images and the captured corresponding depth information to view angles and/or lighting conditions of the monoscopic video cameras $110_1$-$110_N$. In this regard, different view angles and/or lighting conditions may be converted or correspond to different sets of 2D images data and corresponding depth information. In other words, the video processor 120 may interpret the captured 2D monoscopic images in different image planes depending on view angles and/or lighting conditions. An image plane may be assumed to be coincident with the XY-plane of a XYZ coordinate system, and is parallel to the XY-plane at distance d, where d>0. The video processor 120 may be operable to compose or generate 2D and/or 3D images from the captured 2D monoscopic images depending on view angles and/or lighting conditions. For example, for a given view angle and/or given lighting conditions, the video processor 120 may utilize the determined image mapping function to map or convert the captured 2D monoscopic images and the captured corresponding depth information to a specific set of 2D image data and corresponding depth information for the given view angle and/or the given lighting conditions. The video processor 120 may generate or compose 2D and/or 3D video for the given angle and/or the given lighting conditions utilizing the resulting view-angle dependent 2D image data and corresponding view-angle dependent depth information. The generated 2D and/or 3D video for the given view angle and/or the given lighting conditions may be presented or displayed to the user via the display 132 and/or the 3D video rendering device 136.

In various exemplary embodiments of the invention, the video rendering processor 136a may be operable to receive the generated 3D video from the video processor 120. The video rendering processor 136a may be operable to identify one or more objects of interest in the received 3D video. The video rendering processor 136a may track or monitor the identified objects on an image-by-image basis. In this regard, the video rendering processor 136a may evaluate 3D effects such as, for example, brightness, contrast, graphics, spanwise variation, flowering, flying sparks, and/or jumping sharks, associated with the identified objects in the received 3D video. In some instances, the associated 3D effects for the identified objects at a current location are not satisfactory to the user. The video rendering processor 136a may choose or select a preferred location in space according to desired or expected 3D effects to re-locate the identified objects.

A location for an object in space may be represented through a three-dimensional coordinate such as a xyz-coordinate. In video processing, 3D image data may comprise 2D image data and corresponding depth information. The 3D image data for the identified objects at the preferred location may be estimated by interpolating the 3D image data at the current location in the received 3D video. In other words, 2D image data and corresponding depth information at the preferred location may be estimated based on the received 2D image data and the received corresponding depth information at the current location. In this regard, a location difference corresponding to the re-location of the identified objects to the preferred location from the current location may be determined or calculated. For the given view angle and lighting conditions at the current location, a view angle and/or lighting conditions for the identified objects at the preferred location may be selected or determined based on the determined location difference.

Depending on system configuration, the video rendering processor 136a or the 2D/3D graphic processing unit 121 the may utilize the image mapping function, which is determined by the video processor 120, to map or convert the received 2D image data and corresponding depth information for the identified objects at the current location to the preferred location. The mapped 2D image data and the mapped corresponding depth information may be utilized as the estimation of the 2D image data and corresponding depth information for the identified objects at the preferred location. The video rendering processor 136a may then utilize the estimated 2D image data and the estimated corresponding depth information to enhance or adjust the associated 3D effects for the identified objects at the preferred location in the received 3D image. For example, the estimated 2D image data and the estimated corresponding depth information may represent or indicate information in terms of expected highlights or shadows for the identified objects at the preferred location. The video rendering processor 136a may apply the highlights or shadows to the identified objects at the preferred location so as to enhance or adjust the associated 3D effects for the identified objects. The resulting enhanced or adjusted 3D video may be communicated to the 3D display 136c for 3D video rendering.

Figure 2:
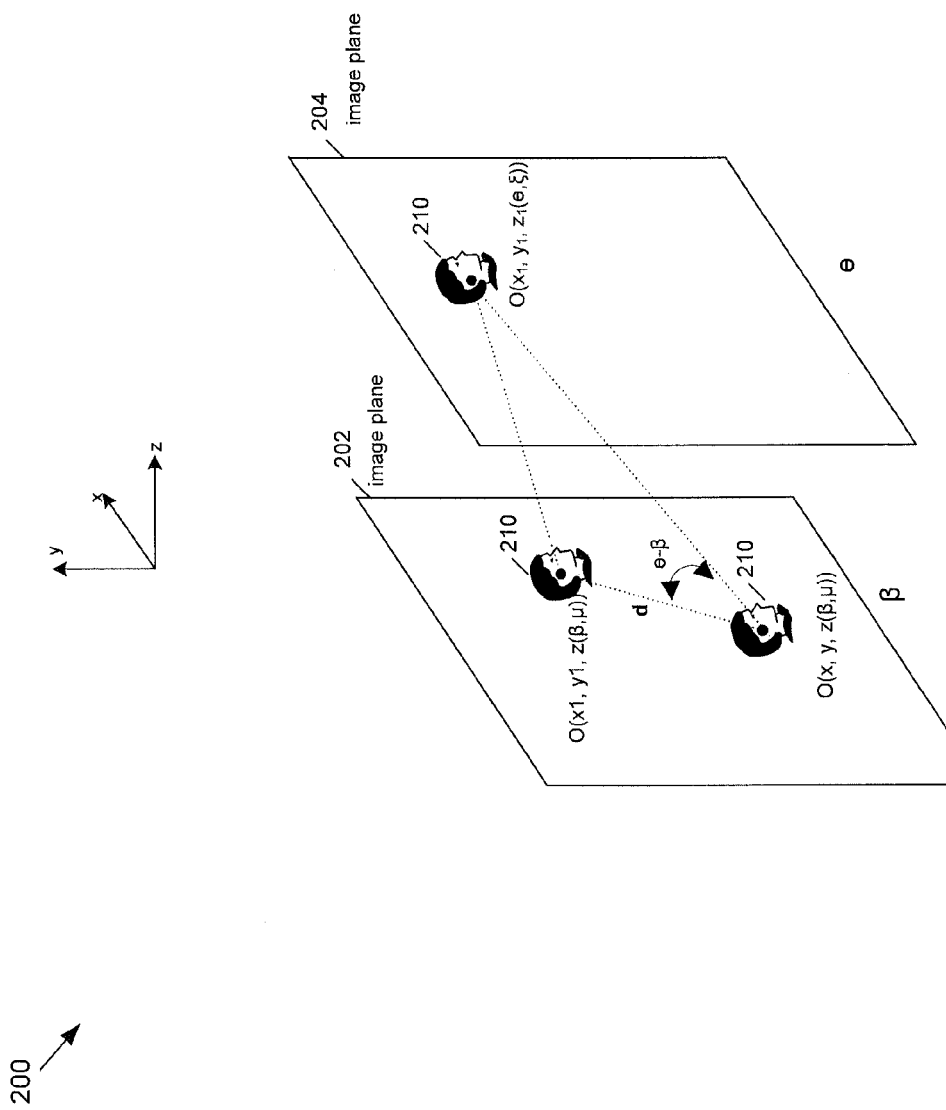
FIG. 2 illustrates mapping of a 3D point to different image planes depending on view angles and lighting conditions, in accordance with an embodiment of the invention.

FIG. 2 illustrates mapping of a 3D point to different image planes 200 depending on view angles and/or lighting conditions, in accordance with an embodiment of the invention. Referring to FIG. 2, there are shown image planes 202 and 204 each comprising image pixels projected in terms of view angles β and θ, respectively. The 2D image data and corresponding depth information of a 3D image may be modeled to an image mapping function by the video processor 120 in terms of view angles and lighting conditions. For example, for a point O(x, y, z) in the image plane 202, 2D image data and corresponding depth information, z(β, μ), may be determined or calculated utilizing the image mapping function for the view angle β and lighting conditions p. In some circumstances, 3D effects associated with the identified object 210 are not satisfactory to the user. It may be desired to re-locate the object 210 within the 3D image for better 3D effects. For example, the point O(x, y, z(β, μ)) in the image plane 202 may be re-located or moved to a preferred location $(x_1,y_1,z_1(θ, ξ))$ in the image plane 204. A resulting location difference or shift, d, within the image plane 202 may be calculated by the following expression:

$$d=\sqrt{(x_1-x)^2+(y_1-y)^2}$$

The calculated location difference d may indicate a location shift caused by the relocation of the identified object 210 to the selected preferred location from the current location. The view-angle difference, θ−β, and the lighting condition change, ξ−μ, between the preferred point $O(x_1,y_1,z_1(θ, ξ))$ and the point O(x, y, z(β, μ)) may be calculated or determined based on z(β,μ), $z_1(θ, ξ)$ and d.

With the known view angle β, the lighting condition μ, and corresponding depth information z(β, μ), the view angle θ and the lighting condition ξ corresponding to the preferred point $O(x_1,y_1,z_1(θ, ξ))$ in the image plane 204 may be determined or calculated. In other words, the view angle θ, the lighting condition ξ and the corresponding depth information $z_1(θ, ξ)$ at the preferred point $O(x_1,y_1,z_1(θ, ξ))$ in the image plane 204 may be estimated or predicted based on the view angle β, the lighting condition μ and the corresponding depth information z(β, μ) at the point O(x,y,z(β, μ)) in the image plane 202. 2D image data at the preferred point $O(x_1,y_1,z_1(θ, ξ))$ in the image plane 204 may be estimated or determined utilizing the image mapping function for the view angle θ and the lighting condition ξ. The estimated 2D video data and the estimated corresponding depth information $z_1(\theta, \xi)$ may be applied to the preferred point $O(x_1,y_1,z_1(\theta, \xi))$ in the image plane 204 to enhance, modify or adjust appropriate 3D effects in the received 3D image.

Figure 3:
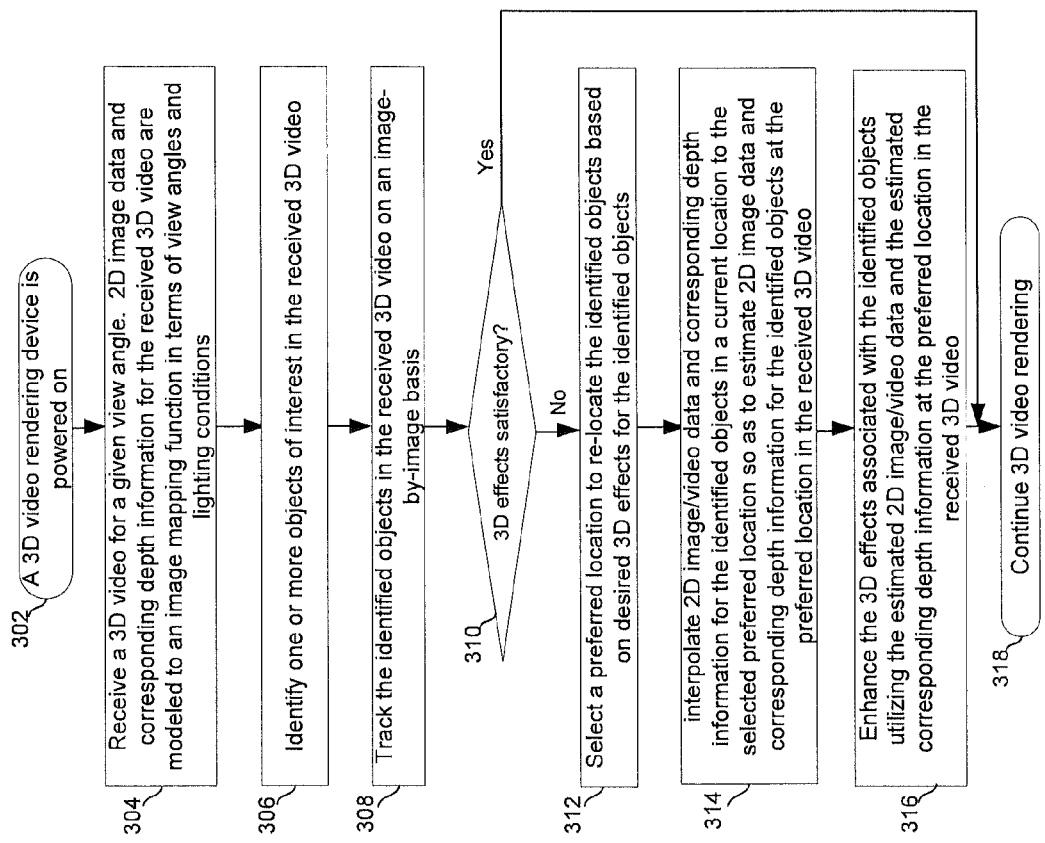
FIG. 3 is a flow chart illustrating exemplary steps that may be performed to enhance 3D effects for 3D video rendering, in accordance with an embodiment of the invention.

FIG. 3 is a flow chart illustrating exemplary steps that may be performed to enhance 3D effects for 3D video rendering, in accordance with an embodiment of the invention. Referring to FIG. 3, the exemplary steps may begin with step 302, in which the 3D video rendering device 136 is powered on. In step 304, the 3D video rendering device 136 may be operable to receive a 3D video for a given view angle β from the video processor 120. The 2D image data and corresponding depth information for the received 3D video may be modeled by the video processor 120 to an image mapping function in terms of the given view angle β and the associated lighting conditions μ. In step 306, the 3D video rendering device 136 may be operable to identify one or more objects of interest, for example, the object 210, in the received 3D video. In step 308, the 3D video rendering device 136 may be operable to track or monitor the object 210 in the received 3D video on an image-by-image basis. In step 310, it may be determined whether 3D effects associated with the identified object 210 at a current location in the received 3D video are satisfactory to the user. In instances where the associated 3D effects for the object 210 at the current location in the received 3D video are not satisfactory to the user, then in step 312, in which the 3D video rendering device 136 may be operable to identify or select a preferred location to re-locate the identified objects based on desired 3D effects for the identified objects. In step 314, 2D image data and corresponding depth information for the identified objects at the current location may be interpolated to the selected preferred location so as to estimate 2D image data and corresponding depth information for the identified objects at the preferred location. In step 316, the 3D video rendering device 136 may apply or utilize the estimated 2D video/image data and the estimated corresponding depth information for the identified objects at the selected preferred location to enhance or adjust the 3D effects associated with the identified objects. In step 318, the 3D video rendering device 136 may present or display the enhanced or adjusted 3D video over the 3D display device 136c to continue 3D video rendering.

In step 310, in instances where the associated 3D effects for the object 210 at the current location in the received 3D video are satisfactory to the user, then the exemplary steps may proceed in step 318.

FIG. 4 is a flow chart illustrating exemplary steps that may be performed to estimate 2D image data and corresponding depth information to enhance 3D effects, in accordance with an embodiment of the invention. Referring to FIG. 4, the exemplary steps may begin with step 402, in which the 3D video rendering device 136 is powered on. The 3D video rendering device 136 may be operable to receive a 3D video for a given view angle from the video processor 120. The 3D effects associated with an object such as the object 210 at a current location in the received 3D video are desired to be enhanced or adjusted. In step 404, the 3D video rendering device 136 may select a preferred location in the received 3D image to re-locate the object 210 based on desired 3D objects for the object 210. In step 406, the 3D video rendering device 136 may be operable to calculate a location difference corresponding to the re-location of the identified object 210 to the selected preferred location from the current location.

In step 408, the 3D video rendering device 136 may determine a view-angle difference and lighting condition changes corresponding to the calculated location difference for the object 210. In step 410, a view angle and lighting conditions for the object at the selected preferred location may be determined based on the determined view-angle difference, the determined lighting condition changes, a view angle for the object at the current location and/or lighting conditions for the object at the current location. In step 412, the 3D video rendering device 136 may be operable to determine 2D image data and corresponding depth information for the object at the selected preferred location based on the determined view angle and/or the determined lighting conditions. For example, the 3D video rendering device 136 may be operable to interpolate 2D image data and corresponding depth information for the object at the current location to the selected preferred location so as to estimate 2D image data and corresponding depth information for the object at the selected preferred location. In step 414, the 3D video rendering device 136 may be operable to apply or utilize the estimated 2D image data and corresponding depth information to the object at the selected preferred location and thereby to enhance or adjust the 3D effects associated with the object in the received 3D video.

Various aspects of a method and system for enhancing 3D effects for 3D video rendering are provided. In various exemplary embodiments of the invention, a 3D video processing device such as the 2D/3D graphic processing unit 121 and/or the 3D video rendering device 136 may be utilized, depending on system configuration, to perform view angle and lighting condition corrections so as to enhance 3D effects on received 3D video. For example, the 3D video rendering device 136 may be operable to receive a 3D video from the video processor 120. The 3D video rendering device 136 may monitor or track 3D effects associated with one or more objects such as the object 210 identified in the received 3D video. In instances where the associated 3D effects for the identified object 210 at a current location are not satisfactory to the user, the 3D video rendering device 136 may be operable to re-locate or move the identified object 210 to a preferred location in the received 3D video. The 2D image data and corresponding depth information for the identified object 210 at the current location may be interpolated to the preferred location. The 3D video rendering device 136 may utilize the interpolated 2D image data and the interpolated corresponding depth information to enhance or adjust the associated 3D effects for the identified object 210 in the received 3D video. In this regard, the 3D video rendering device 136 may be operable to evaluate the associated 3D effects for the identified object 210 at the current location image-by-image and may select the preferred location for re-locating the identified object 210 accordingly. A location difference corresponding to the re-location of the identified object 210 to the selected preferred location from the current location may be calculated to determine a resulting view-angle difference and lighting condition changes. A view angle and lighting conditions for the identified object 210 at the selected preferred location may be determined from the determined view-angle difference, the determined lighting condition changes, a view angle for the identified object 210 at the current location, and lighting conditions for the identified object 210 at the current location. The 2D image data and corresponding depth information for the identified object 210 at the selected preferred location may be estimated based on the determined view angle and the determined lighting conditions for the identified object 210 at the selected preferred location. The 3D video rendering device 136 may utilize the estimated 2D image data and the estimated corresponding depth information to enhance or adjust the associated 3D effects for the identified object 210 at the selected preferred location for 3D video rendering.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for enhancing 3D effects for 3D video rendering.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising: in a video processing system:
    monitoring three-dimensional effects associated with an object in a three-dimensional video;
    re-locating said object within said three-dimensional video to a preferred location from a current location based on said monitoring, wherein said relocating comprises:
        interpolating two-dimensional video data and corresponding depth information for said object at said current location to said preferred location; and
        adjusting said three-dimensional effects associated with said object utilizing said interpolated two-dimensional video data and said interpolated corresponding depth information for said object at said preferred location.

2. The method of claim 1, comprising tracking said three-dimensional effects associated with said object image-by-image.

3. The method of claim 2, comprising evaluating said three-dimensional effects associated with said object at said current location.

4. The method of claim 3, comprising selecting said preferred location based on said evaluation.

5. The method of claim 4, comprising calculating a location difference corresponding to said re-location of said object to said selected preferred location from said current location.

6. The method according to claim 5, comprising determining a view-angle difference and lighting condition changes corresponding to said calculated location difference.

7. The method according to claim 6, comprising determining a view angle and lighting conditions corresponding to said object at said selected preferred location based on said determined view-angle difference, said determined lighting condition changes, the view angle for said object at said current location, and lighting conditions for said object at said current location.

8. The method according to claim 7, comprising estimating two-dimensional video data and corresponding depth information for said object at said selected preferred location based on said determined view angle and said determined lighting conditions corresponding to said object at said selected preferred location.

9. The method according to claim 8, comprising adjusting said three-dimensional effects for said object utilizing said estimated two-dimensional video data and said estimated corresponding depth information for said object at said selected preferred location.

10. The method according to claim 9, comprising rendering said three-dimensional video with said adjusted three-dimensional effects for said object at said selected preferred location.

11. A system for processing signals, the system comprising: one or more circuits for use in a video processing system, said one or more circuits being operable to:
    monitor three-dimensional effects associated with an object in a three-dimensional video;
    re-locate said object within said three-dimensional video to a preferred location from a current location based on said monitoring, wherein said re-locating comprises;
        interpolate two-dimensional video data and corresponding depth information for said object at said current location to said preferred location; and
        adjust said three-dimensional effects associated with said object utilizing said interpolated two-dimensional video data and said interpolated corresponding depth information for said object at said preferred location.

12. The system according to claim 11, wherein said one or more circuits are operable to track said three-dimensional effects associated with said object image-by-image.

13. The system according to claim 12, wherein said one or more circuits are operable to evaluate said three-dimensional effects associated with said object at said current location.

14. The system according to claim 13, wherein said one or more circuits are operable to select said preferred location based on said evaluation.

15. The system according to claim 14, wherein said one or more circuits are operable to calculate a location difference corresponding to said re-location of said object to said selected preferred location from said current location.

16. The system according to claim 15, wherein said one or more circuits are operable to determine a view-angle difference and lighting condition changes corresponding to said calculated location difference.

17. The system according to claim 16, wherein said one or more circuits are operable to determine a view angle and lighting conditions corresponding to said object at said selected preferred location based on said determined view-angle difference, said determined lighting condition changes, the view angle for said object at said current location, and lighting conditions for said object at said current location.

18. The system according to claim 17, wherein said one or more circuits are operable to estimate two-dimensional video data and corresponding depth information for said object at said selected preferred location based on said determined view angle and said determined lighting conditions corresponding to said object at said selected preferred location.

19. The system according to claim 18, wherein said one or more circuits are operable to adjust said three-dimensional effects for said object utilizing said estimated two-dimensional video data and said estimated corresponding depth information for said object at said selected preferred location.

20. The system according to claim 19, wherein said one or more circuits are operable to render said three-dimensional video with said adjusted three-dimensional effects for said object at said selected preferred location.

* * * * *